United States Patent Office 3,352,873
Patented Nov. 14, 1967

3,352,873
N-HYDROXYALKYL-PHENYLALKYLPIPERIDINES
Francis E. Cislak, Charles K. McGill and George W. Campbell, Jr., Indianapolis, Ind., assignors to Reilly Tar & Chemical Corporation, Indianapolis, Ind., a corporation of Indiana
No Drawing. Filed Apr. 19, 1965, Ser. No. 449,312
5 Claims. (Cl. 260—294.7)

ABSTRACT OF THE DISCLOSURE

N-hydroxyalkyl-phenylalkylpiperidines are prepared by standard chlorohydrin reactions with phenylalkylpiperidine. These compounds can also be prepared by other known means such as hydrogenation of the appropriate quaternary pyridinium salt and reaction of the substituted piperidine with the proper alkylene oxide. The resulting hydroxy moiety is available as a reactive site for typical alcohol reactions. These compounds are useful as plasticizers of polyvinylchloride and as inhibitors in pickling steel.

---

This invention relates to new compositions of matter. More particularly, it relates to new organic compounds, N-hydroxyalkyl-phenylalkylpiperidines, which compounds have the general formula:

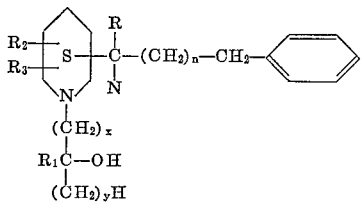

wherein R, $R_1$, $R_2$, and $R_3$ represent hydrogen or lower alkyl, they may be alike or they may be different; $x$ is 0, 1, 2, 3, or 4, and $y$ is 0, 1, or 2; $n$ is 1, 2, 3, or 4.

In general our new compounds may be prepared by the reaction of a chlorohydrin with a phenylalkylpiperidine. Or they may be prepared by the reaction of a chlorohydrin with a phenylalkylpyridine and then catalytically hydrogenating the resulting quaternary pyridinium salt. Some of them may be prepared by reacting an alkylene oxide with a phenylalkylpiperidine.

Our N-hydroxyalkyl-phenylalkylpiperidines are alcohols. They have the chemical properties associated with alcohols and are capable of entering into the same type of reactions as other alcohols, within the limitations imposed by the piperidine nucleus. They are of limited solubility in water and possess a low volatility.

Our N-hydroxyalkyl-phenylpiperidines may be reacted, for example, with alkyl halides to form piperidinium quaternaries. These piperidinium quaternary type salts act as cationic detergents.

The N-hydroxyalkyl-phenylalkylpiperidines react with acids, both aliphatic and aromatic, monocarboxylic and polycarboxylic, to form esters. Some of these esters, for example those of higher molecular weight fatty acids, are useful as plasticizers of polyvinylchloride. These fatty acid esters impart flexibility at low temperatures to the polyvinylchloride and also, because of the tertiary nitrogen present in their molecular make-up, they act as stabilizers of the polyvinylchloride. These esters are new compositions of matter and are the subject of a co-pending application.

Our N-hydroxyalkyl-phenylalkylpiperidines are useful in inhibiting the action of non-oxidizing mineral acids upon steel. Thus, a 5% soluton of our N-hydroxyalkyl-phenylalkylpiperidines dissolved in heavy coal-tar bases is effective as an inhibitor in the pickling of steel with sulfuric acid and in acidizing oil wells with hydrochloric acid.

The manner in which our invention may be carried out is described in the following specific examples. These examples are given by way of illustration only and are not to be construed as a limitation of our invention.

EXAMPLE 1

N-(beta-hydroxyethyl)-4-phenylpiperidine

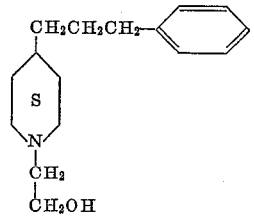

A solution of 197 grams of 4-phenylpropylpiperidine in 500 grams of methanol is placed into a two liter flask equipped with a stirrer and an inlet tube which extends below the surface of the solution. While stirring the solution, 44 grams of ethylene oxide is gradually added to the solution through the inlet tube; the ethylene oxide is added during a two-hour period in the form of a vapor obtained by warming the liquid ethylene oxide by means of a water bath. The temperature of the reaction mixture is maintained at about 25° C. The reaction may be conducted even at a lower temperature, such as 0° C., but the reaction proceeds satisfactorily and at a faster rate at temperatures in the range of 25–30° C. After all of the ethylene oxide has been added, the solution is stirred for about four more hours. Then the methanol is removed by distillation. The residue is N-hydroxyethyl-4-phenylpropylpiperidine. For most purposes, it may be used as is. If, however, a purer product is desired, the semi-pure product is distilled at high vacuum, of the order of 0.5 to 1 mm. Hg pressure.

EXAMPLE 2

N-(beta-hydroxyethyl)-3-phenylpropylpiperidine

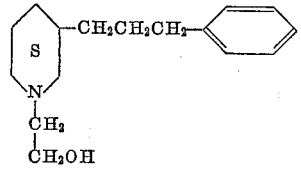

The procedure of Example 1 is repeated with the exception that 3-phenylpropylpiperidine is used in place of the 4-phenylpropylpiperidine.

EXAMPLE 3

N-(beta-hydroxyethyl)-2-phenylpropylpiperidine

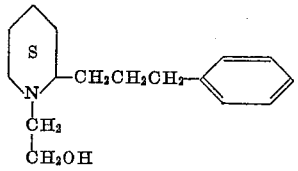

The procedure of Example 1 is repeated with the exception that 2-phenylpropylpiperidine is used in place of the 4-phenylpropylpiperidine.

EXAMPLE 4

N-(delta-hydroxybutyl)-4-phenylpropylpiperidine

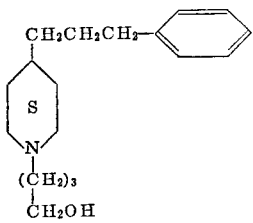

A mixture of 197 grams of 4-phenylpropylpiperidine and 2,000 grams of water is placed into a three-necked flask equipped with a stirrer, a dropping funnel, and a reflux condenser. To this mixture there is added 46 grams of caustic soda. While stirring the mixture, it is warmed to about 70° C. and 108 grams of 4-chloro-n-butyl alcohol is added gradually over a period of about one hour. When all of the 4-chloro-n-butyl alcohol has been added, the solution is heated under reflux conditions for about four hours. The solution is cooled, and the N-(delta-hydroxybutyl)-4-phenylpropylpiperidine formed during the reaction period is isolated in any convenient manner.

EXAMPLE 5

N-(beta-hydroxypropyl)-4-phenylpropylpiperidine

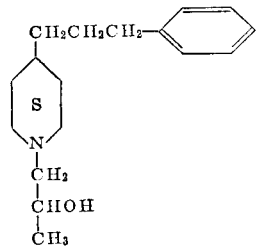

The procedure of Example 1 is repeated with the exception that 58 grams of propylene oxide is used in place of the 44 grams of ethylene oxide.

EXAMPLE 6

N-(beta-hydroxyethyl)-2-phenylpropyl-5-ethylpiperidine

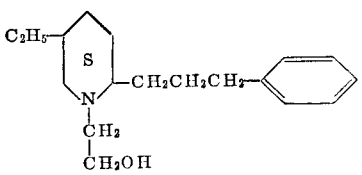

The procedure of Example 1 is repeated with the exception that 225 grams of 2-phenylpropyl-5-ethylpiperidine is used in place of the 197 grams of 4-phenylpropylpiperidine.

EXAMPLE 7

N-(beta-hydroxyethyl)-2,6-dimethyl-4-phenylpropylpiperidine

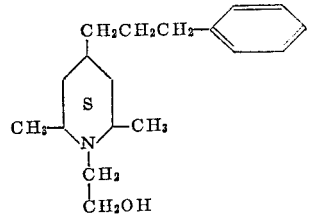

The procedure of Example 1 is repeated with the exception that 225 grams of 2,6-dimethyl-4-phenylpropylpiperidine is used in place of the 197 grams of 4-phenylpropylpiperidine.

EXAMPLE 8

N-(beta-hydroxyethyl)-4-(ethyl,phenylpropyl)piperidine

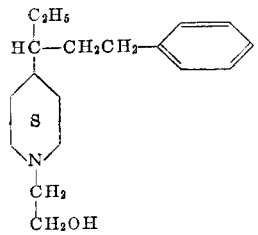

The procedure of Example 1 is repeated with the exception that 225 grams of 4-(ethyl,phenylpropyl)piperidine is used in place of the 197 grams of 4-phenylpropylpiperidine.

EXAMPLE 9

N-(beta-hydroxyethyl)-3-(phenylamyl)piperidine

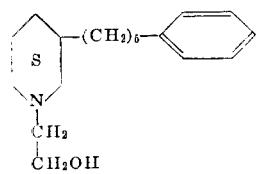

The procedure of Example 1 is repeated with the exception that 225 grams of 3-phenylamylpiperidiene is used in place of the 197 grams of 4-phenylpropylpiperidine.

We claim as our invention:

1. N-hydroxyalkyl-phenylalkylpiperidines of the formula:

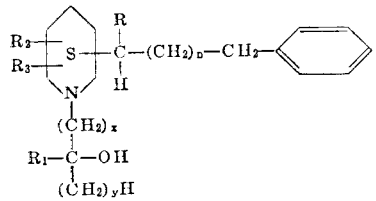

wherein R, $R_1$, $R_2$, and $R_3$ represent a member of the class consisting of hydrogen and lower alkyl; $x$ is selected from the class consisting of 0, 1, 2, 3, and 4; $y$ is selected from the class consisting of 0, 1, and 2; $n$ is selected from the class consisting of 1, 2, 3, and 4.

2. N-(beta-hydroxyethyl)-4-phenylpropylpiperidine.
3. N-(beta-hydroxyethyl)-2-phenylpropylpiperidine.
4. N-(beta-hydroxypropyl)-4-phenylpropylpiperidine.
5. N-(beta-hydroxyethyl)-3-phenylpropylpiperidine.

References Cited

UNITED STATES PATENTS

| | | | |
|---|---|---|---|
| 2,972,617 | 6/1961 | Cislak | 260—294.7 |
| 3,121,087 | 2/1964 | Berg | 260—294.7 |
| 3,317,546 | 5/1967 | Cislak et al. | 260—294 X |

JOHN D. RANDOLPH, Primary Examiner.

AVROM D. SPEVACK, Assistant Examiner.